(No Model.)
F. E. L. HONOLD.
APPARATUS FOR DESILVERIZING LEAD.
No. 446,455. Patented Feb. 17, 1891.
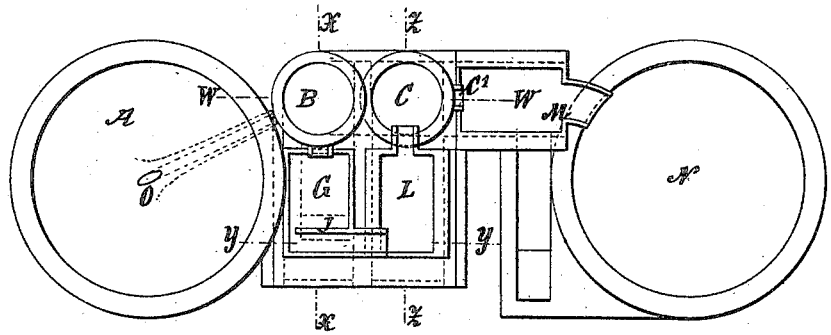
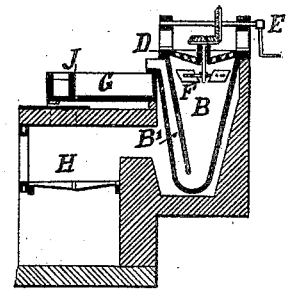
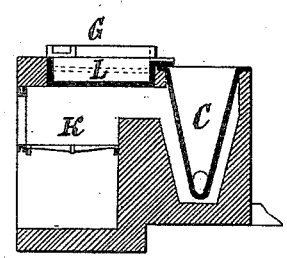
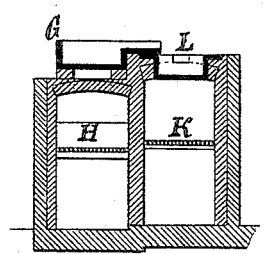
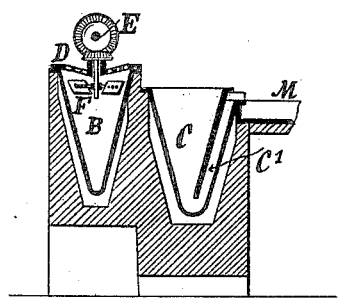

UNITED STATES PATENT OFFICE.

FRIEDRICH EUGEN LUKAS HONOLD, OF BINSFELDHAMMER, NEAR STOLBERG, GERMANY.

APPARATUS FOR DESILVERIZING LEAD.

SPECIFICATION forming part of Letters Patent No. 446,455, dated February 17, 1891.

Application filed September 8, 1890. Serial No. 364,314. (No model.) Patented in Germany May 28, 1890, No. 54,690.

*To all whom it may concern:*

Be it known that I, FRIEDRICH EUGEN LUKAS HONOLD, a subject of the King of Würtemberg, residing at Binsfeldhammer, near Stolberg, Kingdom of Prussia, German Empire, have invented certain new and useful Improvements in Apparatus for Desilverizing Lead, (for which I have obtained a patent in Germany, No. 54,690, bearing date May 28, 1890,) of which the following is a specification.

This invention relates to a new and useful improvement in the apparatus for desilverizing raw or argentiferous lead by a continuous process. The lead is first melted in a pot, then raised into a funnel-shaped pot containing zinc, from which it is passed upon a pan and thence into a second pan. From the second pan it passes into a second pot containing zinc, thence into a third pan, and finally into a steaming-pot.

In the accompanying drawings, Figure 1 is a ground plan of my improved apparatus; Fig. 2, a section on line $x\ x$, Fig. 1; Fig. 3, a section on line $y\ y$, Fig. 1; Fig. 4, a section on line $z\ z$, Fig. 1; and Fig. 5, a section on line $w\ w$, Fig. 1.

The lead to be desilvered by continuous process is melted in a pot A, while zinc is simultaneously melted in funnel-shaped pots B and C. A perforated cover D is placed on pot B. This cover is provided with a beater F, that may be revolved by crank E. The molten lead is from pot A lifted by a lead-pump or by the communicating pipe O, cast on the pot A, or by a similar device onto the perforated cover D, that divides it into a number of fine jets. These jets are agitated by beater F before the lead reaches the zinc. Owing to the specific gravity of the lead, it passes through the zinc, but it combines with some of the zinc, the quantity of zinc taken up by the lead depending upon the degree of heat in pot B.

The pot B is provided at one side with a channel B', through which the lead flows into pan G. In this pan the lead cools somewhat, as the pan is only warmed but not heated by the fire-chamber H, that heats pot B. By the cooling a scum of zinc and lead containing silver is formed. This scum is retained by a partition J, while the lead flows into a second pan L, heated directly by fire-chamber K. Here the lead is warmed, and thence it flows into funnel-shaped pot C, containing zinc, and heated by fire-chamber K. In this pot the lead can again take up as much zinc as it has left behind as scum in pan G. The pot C, of the same construction as pot A, is provided with a channel C', through which the lead flows into pan M, which is not heated. The pot C can receive a cover D, like the pot B, if it should be necessary in some cases. In the pan M the lead is cooled and a scum separated containing silver. This scum is removed, and the desilverized lead flows into a pot N, which is placed in one plane with pot A. In this pot N the lead is steamed to free it entirely from the zinc, the antimony, and other impurities. In the pot N the lead is red-hot, and the steam streaming in oxidizes the zinc, antimony, and other metals, and these oxides are taken off. It is desirable to throw upon the zinc within the funnel-shaped pots some pulverized charcoal or similar substance to prevent oxidation of the zinc. The oxidized layers formed upon the surface of the jets of lead are retained by the charcoal before they come into contact with the zinc. The consumption of zinc is very small, as the lead that passes through the zinc only takes up as much zinc as is proportionate to the temperature of the contents of the pots. Mechanically no zinc is carried along, as this is prevented by the depth of the funnel-shaped pots B and C and their communicating channels B' and C'.

What I claim is—

The combination of pot B, having channel B', pot C, having channel C', a pair of communicating pans G L, connecting the pots B C, and an additional pan M and pot N, communicating with pot C, substantially as specified.

In testimony whereof I hereunto sign my name, in the presence of two subscribing witnesses, this 14th day of August, 1890.

FRIEDRICH EUGEN LUKAS HONOLD.

Witnesses:
JOHN HECKMANNS,
GEORGE SINGE.